United States Patent [19]

Peng

[11] Patent Number: 5,447,974
[45] Date of Patent: Sep. 5, 1995

[54] CATHODIC ELECTROCOATING COMPOSITIONS CONTAINING BRANCHED EPOXY AMINE RESINS

[75] Inventor: Stephen C. Peng, Shelby Township, Mich.

[73] Assignee: E. I. Du Pont de Nemours and Company, Wilmington, Del.

[21] Appl. No.: 382,117

[22] Filed: Feb. 1, 1995

Related U.S. Application Data

[62] Division of Ser. No. 267,076, Jun. 28, 1994.

[51] Int. Cl.⁶ ............................................. C08L 63/00
[52] U.S. Cl. .................................... 523/415; 528/104; 523/414
[58] Field of Search ......................... 523/415; 528/104

[56] References Cited

U.S. PATENT DOCUMENTS

| | | | |
|---|---|---|---|
| 3,984,299 | 10/1976 | Jerabek | 204/181 |
| 4,302,524 | 11/1981 | Mandella et al. | 430/155 |
| 4,474,929 | 10/1984 | Schrader | 525/482 |
| 4,722,990 | 2/1988 | Koenig et al. | 528/95 |
| 4,795,791 | 1/1989 | Koenig et al. | 525/523 |
| 4,824,927 | 4/1989 | Dobbelstein et al. | 528/88 |
| 5,070,149 | 12/1991 | DebRoy et al. | 525/296 |
| 5,128,393 | 4/1992 | Peng et al. | 523/402 |

FOREIGN PATENT DOCUMENTS

| | | |
|---|---|---|
| 210918 | 8/1982 | Germany . |
| 58125760 | 1/1982 | Japan . |
| 58179272 | 4/1982 | Japan . |
| 59-011369 | 1/1984 | Japan . |
| 62246931 | 4/1986 | Japan . |
| 63223073 | 3/1987 | Japan . |

*Primary Examiner*—Frederick Krass
*Attorney, Agent, or Firm*—Hilmar L. Fricke

[57] ABSTRACT

An improved aqueous cathodic electrocoating composition of an aqueous carrier having dispersed therein a film forming binder of (1) an epoxy resin-amine adduct and (2) a blocked polyisocyanate crosslinking agent; wherein the improvement is the use of a branched epoxy resin to form the adduct which is the reaction product of a polyhydric phenol and a branched epoxy macromonomer formed by the self condensation of an epoxy resin in the presence of a catalyst; the branched epoxy resin has an epoxy equivalent weight of about 700-2,000 and provides an electrocoating composition that has improved throw power and that forms coatings that have improved corrosion resistance in comparison to conventional electrocoating compositions formed from linear epoxy resins.

5 Claims, No Drawings

CATHODIC ELECTROCOATING COMPOSITIONS CONTAINING BRANCHED EPOXY AMINE RESINS

This is a division of application Ser. No. 08/267,076, filed Jun. 28, 1994.

BACKGROUND OF THE INVENTION

This invention is directed to a cathodic electrocoating composition and in particular to a cathodic electrocoating composition containing branched epoxy amine resin that forms a composition with improved throw power and electrodeposited films of the composition have improved corrosion resistance.

The coating of electrically conductive substrates by an electrodeposition process also called an electrocoating process is a well known and important industrial process. Electrodeposition of primers to automotive substrates is widely used in the automotive industry. In this process, a conductive article, such as an auto body or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired thickness of coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

Throw power of electrocoating compositions continues to be a problem as does the corrosion resistance that the electrodeposited coating provides to the substrate. Throw power is the degree to which an electrodeposited film penetrates and coats the surfaces of recessed interior areas of an automobile or truck body. Electrodeposition of coatings follows the force lines of the electrical field that exists in an electrocoating bath between the cathode and the anode. These force lines diminish as they penetrate into the recessed areas of the auto or truck body and cease to exist when the recessed area is too deep and a coating will not be deposited into such an area.

As automobile and truck body designs change, there is an increased need for electrocoating composition that have increased throw power and that will penetrate and coat recessed areas and there is a continued need for electrocoating compositions that provide improved corrosion resistance. The improved composition of this invention has increased throwing power and provides a film having improved corrosion along with other desirable characteristics such as solvent, and chip resistance.

SUMMARY OF THE INVENTION

An improved aqueous cathodic electrocoating composition of an aqueous carrier having dispersed therein a film forming binder of (1) an epoxy-resin amine adduct and (2) a blocked polyisocyanate crosslinking agent; wherein the improvement is the use of a branched epoxy resin to form the adduct which is the reaction product of a polyhydric phenol and a branched epoxy macromonomer formed by self-condensation of an epoxy resin in the presence of a catalyst; the branched epoxy resin has an epoxy equivalent weight of about 700–2,000 and provides an electrocoating composition that has improved throw power and that forms coatings that have improved corrosion resistance incomparison to conventional electrocoating compositions formed from linear epoxy resins.

DETAILED DESCRIPTION OF THE INVENTION

The film forming binder of the principal emulsion used to form the cathodic electrocoating composition is an epoxy resin amine adduct and a blocked polyisocyanate crosslinking agent. The epoxy resin amine adduct is formed from a branched epoxy macromonomer which is reacted with a polyhydric phenol and then reacted with an amine. The epoxy resin amine adduct usually is blended with a blocked polyisocyanate and then reacted with an acid and inverted into water to form an aqueous emulsion. Other ingredients are then added such as pigment in the form of a pigment paste, anitcrater agent, flexibilizers, defoamers, wetting agents and the like to form a commercial electrocoating composition useful for example for electrocoating auto and truck bodies.

The epoxy resin used to form the branched epoxy macromonomer is an epoxy terminated polyepoxy hydroxy ether resins having a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of dihydric phenols such as bisphenol A. These polyepoxides are produced by etherification of dihydric phenols with epihalohydrin or dihalohydrin such as epichlorohydrin or dichlorohydrin in the presence of alkali. Examples of dihydric phenols are 2,2-bis-(4hydroxyphenyl)ethane; 2-methyl-1,1-bis-(4-hydroxyphenyl)propane; 2,2-bis-(4-hydroxy-3-tertiarybutylphenyl)propane; 1,1-bis-(4-hydroxyphenol)ethane; bis-(2-hydroxynaphthyl)methane; 1,5-dihydroxy-3-naphthalene or the like.

Examples of preferred commercial epoxy resins are Epon 828®, Epon 1001®, Epon 1001F®, Epon 1002F®, Epon 1004F®. Most preferred are Epon 828® and Epon1001F® since these resins form high quality products. About 1–15% by weight, based on the weight of the epoxy resin of a multifunctional epoxy resin (more than two epoxy groups) can be used.

To form a branched epoxy macromonomer instead of a linear high molecular weight epoxy resin, the epoxy resin is reacted in the presence of an amine catalyst at about 90°–150° C. for about 1–4 hours preferably under an inert atmosphere such as nitrogen. The macromonomer has a weight average molecular weight of about 400–800.

The following are useful amine catalyst for forming the branched epoxy macromonomer: aromatic ring containing aliphatic tertiary amines such as N,N dimethylbenzyl amine, alpha methylbenzyldimethyl amine, 2-(dimethylaminomethyl) phenol, 2,4,6-tris (dimethylaminomethyl) phenol; linear and branched aliphatic tertiary amines such as triethyl amine, tri-n-propyl amine, tri-n-butyl amine, triamyl amine, tri-n-hexyl amine, N,N,N,N-tetramethyl-1,2,ethane diamine, N,N,N,N-tetramethyl-1,3-butane diamine, alkyl tertiary monoamines; alkanol amines such as methylethanol amine, methyldiethanol amine, dimethylethanol amine, dimethlyamino-2-propanol, dimethylaminoethoxyethanol, diethylethanolamine, triethanolamine, 2-dimethylamino-2-hydroxypropane and the like; secondary amines such as diethylamine di-n-propylamine, diisopropylamine, and the like; primary amines such as monoethyl amine, monopropyl amine, monobutylamine, monoamyl amine, monohexyl amine and the like; polyamines such as aminoethylethanol amine, dimethyl aminopropyl amine, diethylene triamine, triethylene tetramine, tetraethylene pentyl amine, 3,3-aminobispropyl amine and the like; amine epoxy adducts of a low molecular weight monofunctional or polyfunctional amine such as aminoethylethanol amine or triethylene tetramine; amine adducts of low molecular weight monofunctional or polyfunctional epoxy resins with a mono or poly functional amine such as aminoethyl ethanol amine or diethylene triamine; alkylene oxide adducts of amines; quaternary bases such as benzyltrimethyl ammonium chloride, benzyltrimethyl ammonium hydroxide, tetramethyl ammonium chloride, tetrabutyl ammonium chloride and the like; alicyclic amines such as N-methyl piperazine, hydroxy piperazine, piperidine, morpholine, anabasine and the like; amides such as acetamide, benzylamide, adipamide; fatty amides derived from fatty acids such as dimer or trimer fatty acid; fatty imidazoline polyamines from cyclodehydration of a fatty acid and a polyamine; amnidoamines derived from a basic carboxylic acid such as fatty acids and amines and an amine; boron trifluoride amine complexes such as boron trifluoride-monoethyl amine complex, boron trifluoride-methoxyanaline and the like.

The polyhydric phenol used to form the branched epoxy resin can be any of the aforemention or dihydric phenols corresponding to the following formula:

HO—X—OH wherein X is 1,2-phenylene, 1,3-phenylene, 1,4-phenylene or

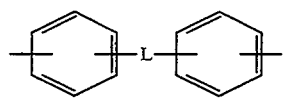

wherein L is a direct bond, alkylene of 1–6 carbon atoms, alkylidene of 2–6 carbon atoms or $SO_2$. These represent, for example bisphenols F, A and S, catechol, resorcinol, o,o'-biphenol and p,p'-biphenol. The various phenols may be substituted on the respective phenyl ring by such non-reactive substitutes such as hologen, alkyl and the like.

A small amount of a multihydric phenol, i.e., a phenol having at least three reactive hydroxyl groups can be used with the dihydric phenol and the macromonomer in the formation of the branched epoxy resin and significantly improves the throw power of the electrocoating composition. Typically, the molar ratio of multihydric phenol to dihydric phenol is about 0.005/1 to about 1/1.

Typical reaction conditions used to form the branched epoxy resin are about 140–185° C. for about 1–4 hours.

The branched epoxy resin has a weight average molecular weight of about 1,400–6,000, and an epoxy equivalent weight of about 700–2,000. Epoxy equivalent weight is the weight of resin in grams which contains one gram equivalent of epoxy.

The adduct of the branched epoxy resin is formed by reacting the epoxy resin with an amine and then the adduct is neutralized with an acid to form an aqueous emulsion, referred to a the principal emulsion. The principal emulsion also contains a crosslinking agent, preferably a blocked polyisocyanate.

Typical amines that are used to form the adduct are primary and secondary amines such as diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amines such as methyl ethanol amine are preferred.

Typical acids used to neutralize the epoxy-amine adduct to form water dispersible cationic groups are lactic acid, acetic acid, formic acid, sulfamic acid and the like.

Ketimines can also be used with the above amines. Ketimines are formed from ketones and primary amines. The water formed is removed, for example, by azeotropic distillation. Useful ketones include dialkyl, diaryl and alkylaryl ketones having 3–13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. One typically useful ketimine is diketimine which is the ketimine of diethylene triamine and methyl isobutyl ketone.

Preferred polyisocyanate crosslinkers that are used are well known in the prior art. These are aliphatic, cycloaliphatic and aromatic isocyanates such as hexamethylene diisocyanate, cyclohexamethylene diisocyanate, toluene diisocyanate, methylene diphenyl diisocyanate (MDI) and the like. These isocyanates are pre-reacted with a blocking agent such as oximes, alcohols, or caprolactams which block the isocyanate functionality, i.e., the crosslinking functionality. One preferred mixture of blocking agents is methanol, ethanol and diethylene gylcol monobutyl ether. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The binder of the electrocoating composition typically contains about 50–75% by weight of the epoxy amine adduct and 50–25% of the blocked isocyanate and are the principal resinous ingredients in the electrocoating composition.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, clay and the like. Pigments with high surface areas and oil absorption should be used judiciously because these can have an undesirable affect on coalescence and flow of the electrodeposited coating.

The pigment to binder weight ratio of the electrocoating bath is also important and should be preferably less than 0.5:1, more preferably less than 0.4:1, and usually about 0.1 to 0.4:1. Higher pigment to binder weight ratios have been found to adversely affect coalescence and flow.

The electrocoating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of the binder of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight of the binder of the composition.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.01 to 1.0 microns, preferably, less than 1.0 micron. The concentrations of the binder in the aqueous medium in general is not critical, but ordinarily the major portion of the aqueous dispersion is water. The aqueous dispersion usually contains from about 10 to 50 percent preferably 30 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLE 1

Preparation of a Branched Polyepoxide Emulsion

A branched polyepoxide emulsion was prepared by first forming a macromonomer having an average of at least one or more epoxy groups per molecule by self condensation of an epoxy resin in the presence of a catalyst and then reacting with bisphenol A. The following ingredients were charged into a suitable reaction vessel equipped with a stirrer and a heating source:

|  | Parts by Weight |
|---|---|
| EPON 828 ® (diglycidyl ether of bisphenol A having an epoxy equivalent weight of 188 | 658.0 |
| N,N - Dimethylbenzyl amine | 3.3 |
| Bisphenol A | 257.6 |
| Diglycidyl ether of ethoxylated bisphenol A | 219.0 |
| Triphenyl ethyl phosphonium iodide catalyst | 0.9 |
| N-Methylethanol amine | 90.0 |
| TDI blocked isocyanate crosslinker solution (70% solids solution in a 90/10 weight mixture of methyl isobutyl ketone/butanol solvent of a half-capped toluene diisocyanate (80/20 2,4-/2,6 - isomomer mixture) with 2-ethylhexanol reacted with trimethylol propane in a 3:1 molar ratio) | 1087.5 |
| Polypropoxylated bisphenol A | 132.3 |
| Anticrater additive (described in U.S. Pat. Nos. 4,420,574 and 4,423,166) | 94.4 |
| "Amine C" (alkyl imidazolines available from Ciba Geigy Industrial Chemicals) | 35.0 |
| Aqueous Lactic Acid Solution (88% aqueous solution) | 78.9 |
| Deionized water | 3511.0 |
| Total | 6167.9 |

The EPON 828 ® was charged into the reaction vessel and heated with agitation and under a nitrogen atmosphere to 145° C. The N,N dimethylbenzylamine catalyst was then added to the reaction vessel. The reaction mixture was held at about 145° C. until a macromonomer was formed that had an epoxy equivalent weight of 230. The Gardner Holdt viscosity of the macromonomer solution at 70% solid was T-U. Bisphenol A and the diglycidyl ether of ethoxylated bisphenol A and the catalyst were then added and the reaction mixture was heated to 145° C. and an exothermic reaction occurred and peaked at a temperature of about 182° C. and held at this temperature until the epoxy equivalent weight was about 1010. The TDI blocked crosslinker solution was added and the reaction mixture was cooled to about 105° C. N-methylethanol amine was added and the reaction mixture temperature was increased to about 122° C. and held at this temperature for about 1 hour. Polypropoxylated bisphenol A and the anticrater agent were added and the reaction temperature was held at about 105° for about 30 minutes. An emulsion of about 57% solids was formed by adding deionized water, "Amine C" and lactic acid. The emulsion was further diluted with deionized water to 36% solids and the emulsion had a particle size of about 1000 Angstroms, a conductivity of about 2400 micro mhos and a pH of 5.6.

Preparation of Pigment Grinding Vehicle

The pigment grinding vehicle was prepared by charging 750 parts imidazoline amine described in Example 1 of U.S. Pat. No. 5,128,393 into a suitable reaction vessel under nitrogen blanket and heated to about 66° C. 812 parts of DY025 of the formula:

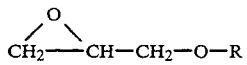

where R is a $C_{12}$-$C_{14}$ alkyl group, were added to the reaction vessel at such a rate that the reaction temperature was maintained at about 93° C. The reaction mixture was held at 93° C. until the DY025 was added and the epoxy equivalent weight was essentially infinite. The resulting product had a solids content of about 80%, a Gardner-Holdt viscosity of V-Y measured at about 20° C. and an amine equivalent weight of 291.6 at 100% solids. To neutralize the product 497 parts of an aqueous lactic acid solution (88% aqueous solution) was added to 776 parts of the product and heated to about 38° C. The exothermic neutralization reaction raised the temperature to about 52° C. The resulting reaction mixture was reduced with 440 parts of 2-butoxyethanol to about 80% solids.

| Preparation of Pigment Paste | Parts by Weight |
|---|---|
| Pigment Grinding Vehicle (prepared above) | 116.6 |
| Foammaster 111 (antifoam agent) | 3.8 |
| Deionized Water | 415 |
| Titanium Dioxide Pigment | 267 |
| Aluminum Silicate Pigment | 53 |
| Lead Silicate Pigment | 23 |
| Carbon Black Pigment | 8 |
| Dibutyl Tin Oxide | 31 |
| Total | 1000 |

The above ingredients were mixed until homogenous in a suitable mixing container. They were then dispersed in a sandmill until a Hegman reading of seven or greater is obtained. The nonvolatile of the paste is 50%

| Preparation of Electrocoating Bath A | Parts by Weight Bath A |
|---|---|
| Branched polyepoxide emulsion (prepared above) | 1688 |
| Pigment paste (prepared above) | 384 |
| Deionized water | 1928 |
| Total | 4000 |

Electrocoating Bath A was prepared by adding the pigment paste to the emulsion with agitation and diluting this mixture with deionized water and charged into a cathodic electrocoating tank and the corrosion protection of films electrodeposited were measured.

Electrocoating Bath B was prepared by using a linear chain extended polyepoxide emulsion of Example H of U.S. Pat. No. 5,070,149 in the place of the the branched polyepoxide emulsion of Bath A and the pigment paste of Example G of the above U.S. Patent was used for the pigment paste of Bath A. Bath B was charged into an electrocoating tank and the corrosion protection of films electrodeposited were measured.

Zinc phosphate treated steel panels were electrocoated in each of the baths. The bath temperature was 30° C. and a voltage was used to deposit a film having a thickness of 0.8-0.9 mils. The coated panels were baked at three different times and temperatures described in the following table and each panel was scribed and exposed to a 50 cycles scab corrosion test (Ford Laboratory Test Method B1 12301). The above results and the results from Example 2 wherein Bath C also was tested for corrosion protection are shown in the following Table 1:

TABLE 1

| SCAB CORROSION TEST | |
|---|---|
| BAKE CONDITIONS | SCRIBE CREEPAGE IN MM |
| Baked at 165° C. for 17 minutes | |
| BATH A - invention containing branched polyepoxide resin | 2.34 |
| BATH B - conventional linear polyepoxide resin | 5.90 |
| BATH C - Ex. 2 of invention containing branched polyepoxide resin | 2.05 |
| Baked at 182° C. for 17 minutes | |
| BATH A - described above | 2.34 |
| BATH B - described above | 4.30 |
| BATH C - described above | 2.50 |
| Baked at 200° C. for 17 minutes | |
| BATH A - described above | 1.64 |
| BATH B - described above | 3.29 |
| BATH C - described above | 2.70 |

Baths A and C which illustrate the invention and use branched epoxy resins had significantly better corrosion protection in comparison to Bath B which is a commercial electrocoating composition prepared with a linear epoxy resin. The corrosion protection on sharp edges was shown by electrocoating two separate sets of razor blades (10×2 cm) with 38° blade angle at 215 volts in Bath A and in Bath B. The blades were each electrocoated at 215 volts and baked at about 182° C. for about 17 minutes to provide a coating having a dry film build thickness of about 0.9 mils. The razor blades were exposed to 150 hours of a standard salt spray test and then the rust spots on each of the blades was counted using 10X magnification microscope and averaged for each set and the results are shown in the following Table 2:

TABLE 2

| ELECTROCOATING BATH | Number of rust spots on razor blade |
|---|---|
| BATH A - invention described above | 40 |
| BATH B - made with conventional linear epoxy resin as described above | 100 |

EXAMPLE 2

A branched polyepoxide emulsion was prepared as in Example 1 except a blocked MDI crosslinker solution was used instead of the blocked TDI crosslinker solution. An electrocoating Bath C was prepared which was identical to Bath A except that the above prepared branched polyepoxide emulsion was used. The throw power and wedge of Baths B (described in Example 1 which is formed from a linear polyepoxide) and Bath C were measured according Ford Test Method BI 20-2C. The throw power test that was used was a Ford NAAO Throw Power Test The results of the wedge and throw power tests are shown in Table 2 below.

TABLE 2

| | THROW POWER (inches) | WEDGE (0.2 mil) |
|---|---|---|
| BATH B (conventional linear | 11 | 2.75 |

TABLE 2-continued

| | THROW POWER (inches) | WEDGE (0.2 mil) |
|---|---|---|
| polyepoxide resin) | | |
| BATH C (invention branched polyepoxide resin) | 13.8 | 6.25 |

The above results of the tests show Bath C formulated with the branched polyepoxide resin gave significantly better throw power and a better wedge in comparison to a convention electrocoating composition illustrated by Bath B which was formulated with a linear polyepoxide resin.

I claim:

1. A method of preparing a cathodic electrocoating composition comprising the following steps in any workable order:
   (a) preparing an epoxy resin-amine adduct by forming a macromonomer of a branched epoxy resin having a weight average molecular weight of 400–800 by self-condensation of an epoxy resin of a polyglycidyl ether of a polyphenol in the presence of an amine catalyst at 90–150 degrees celsius and then reacting the macromonomer with a polyhydric phenol to form a branched epoxy resin having an epoxy equivalent weight of about 700–2,000 and reacting the branched epoxy resin with an amine;
   (b) preparing a blocked polyisocyanate crosslinking agent;
   (c) blending the epoxy-resin amine adduct with the blocked polyisocyanate crosslinking agent;
   (d) neutralizing the epoxy-resin amine adduct with an organic acid and adding water to form an emulsion; and
   (e) blending the emulsion with a pigment paste to form the cathodic electrocoating composition.

2. The method of claim 1 in which the macromonomer is formed from a poly epoxy hydroxy ether resin and the branched epoxy resin has a weight average molecular weight of about 1,400–6,000.

3. The method of claim 2 in which the poly epoxy hydroxy ether resin is the polyglycidyl ether of bisphenol A.

4. The method of claim 3 in which the polyhydric phenol is a dihydric phenol of the formula
HO—X—OH
wherein X is 1,2-phenylene, 1,3-phenylene, 1,4-phenylene

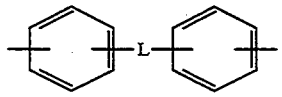

wherein L is a direct bond, alkylene group having 1–6 carbon atoms, alkylidene having 2–6 carbon atoms or $SO_2$.

5. The method of claim 1 in which the polyepoxy hydroxy ether resin is the digylcidyl ether of bisphenol A, the catalyst is an amine catalyst and the polyhydric phenol is bisphenol A.

* * * * *